(12) United States Patent
Lee et al.

(10) Patent No.: US 11,577,642 B2
(45) Date of Patent: Feb. 14, 2023

(54) TURN SIGNAL LAMP FOR OUTSIDE MIRROR

(71) Applicant: SMR Automotive Modules Korea Ltd., Cheongju-si (KR)

(72) Inventors: Jae Geun Lee, Incheon (KR); Sung Ho Jung, Incheon (KR); Dong Sung Seo, Ansan-si (KR)

(73) Assignee: SMR Automotive Modules Korea Ltd., Cheongju-si (KR)

( * ) Notice: Subject to any disclaimer, the term of this patent is extended or adjusted under 35 U.S.C. 154(b) by 0 days.

(21) Appl. No.: 17/661,712

(22) Filed: May 2, 2022

(65) Prior Publication Data
US 2022/0348133 A1    Nov. 3, 2022

(30) Foreign Application Priority Data

Apr. 30, 2021    (KR) .......................... 10-2021-0056880

(51) Int. Cl.
| | |
|---|---|
| *B60Q 1/26* | (2006.01) |
| *F21S 43/14* | (2018.01) |
| *F21S 43/245* | (2018.01) |
| *F21S 43/19* | (2018.01) |
| *B60R 1/12* | (2006.01) |

(Continued)

(52) U.S. Cl.
CPC .......... *B60Q 1/2665* (2013.01); *B60R 1/1207* (2013.01); *F21S 43/14* (2018.01); *F21S 43/19* (2018.01); *F21S 43/245* (2018.01); *F21S 43/27* (2018.01); *F21Y 2115/10* (2016.08)

(58) Field of Classification Search
CPC ........ B60Q 1/2665; F21S 43/14; F21S 43/19; F21S 43/245; F21S 43/27; B60R 1/1207
See application file for complete search history.

(56) References Cited

U.S. PATENT DOCUMENTS

| | | | | |
|---|---|---|---|---|
| 9,797,568 B2 * | 10/2017 | Akutsu | .................... | F21S 43/14 |
| 10,036,522 B2 * | 7/2018 | Aizawa | ................. | F21S 43/237 |

(Continued)

FOREIGN PATENT DOCUMENTS

| | | |
|---|---|---|
| JP | 2007-253681 A | 10/2007 |
| KR | 10-0802702 B1 | 2/2008 |
| KR | 10-0865007 B1 | 10/2008 |

OTHER PUBLICATIONS

Non-Final Office Action for KR10-2021-0056880 by Korean Intellectual Property Office dated Oct. 5, 2022.

*Primary Examiner* — Matthew J. Peerce
(74) *Attorney, Agent, or Firm* — Broadview IP Law, PC (57) ABSTRACT

A turn signal lamp for an outside mirror is disclosed. The turn signal lamp comprises a lens and a light source module coupled to one side of the lens. The light source module includes a printed circuit board (PCB), a PCB assembly including a light emitting diode (LED) disposed on the PCB to output light, and a light source module case configured to accommodate the PCB assembly in an internal space. The light source module case includes a recess formed horizontally along a circumference of a surface of the light source module case. The lens includes a lens protrusion in which a part of the lens protrudes in a shape corresponding to the recess. The lens protrusion is inserted into the recess to come into close contact with a front surface of the recess, so that the light source module and the lens are coupled to each other.

11 Claims, 12 Drawing Sheets

(51) Int. Cl.
F21S 43/27 (2018.01)
F21Y 115/10 (2016.01)

(56) References Cited

U.S. PATENT DOCUMENTS

| | | | |
|---|---|---|---|
| 10,247,873 B2 * | 4/2019 | Min | F21S 43/247 |
| 10,683,981 B2 * | 6/2020 | Wang | F21S 43/243 |
| 2014/0140081 A1 * | 5/2014 | Takahashi | G02B 6/001 |
| | | | 362/509 |

* cited by examiner

TURN SIGNAL LAMP FOR OUTSIDE MIRROR

CROSS-REFERENCE TO RELATED APPLICATION

This application claims priority under 35 U.S.C. § 119 to Korean Patent Application No. 10-2021-0056880 filed in the Korean Intellectual Property Office on Apr. 30, 2021, the entire contents of which are hereby incorporated by reference.

TECHNICAL FIELD

The present disclosure relates to a turn signal lamp for an outside mirror, and more specifically, to a turn signal lamp for an outside mirror, which does not apply a housing to a lens integrally applied with a light guide, thereby reducing the number of parts and solving the limitation to a size of a lamp, and has an appearance with various improved images.

RELATED ART

Figure 1:
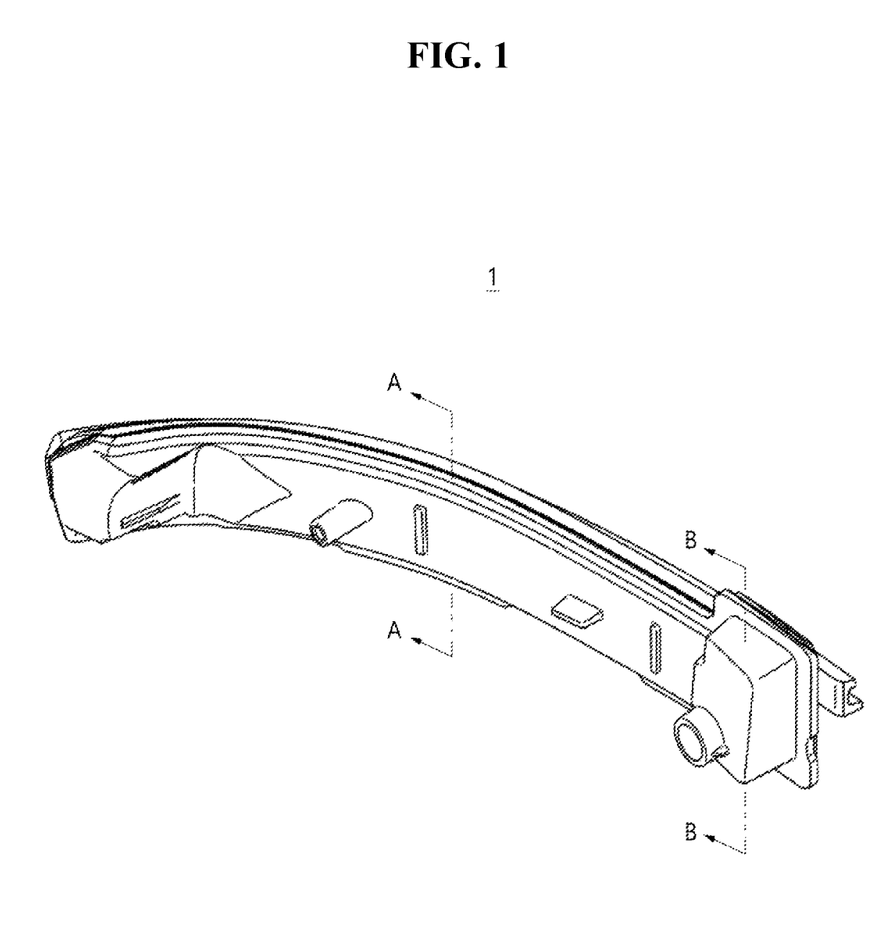
FIGS. 1 to 3 are views for describing a conventional turn signal lamp for an outside mirror.
Figure 2:
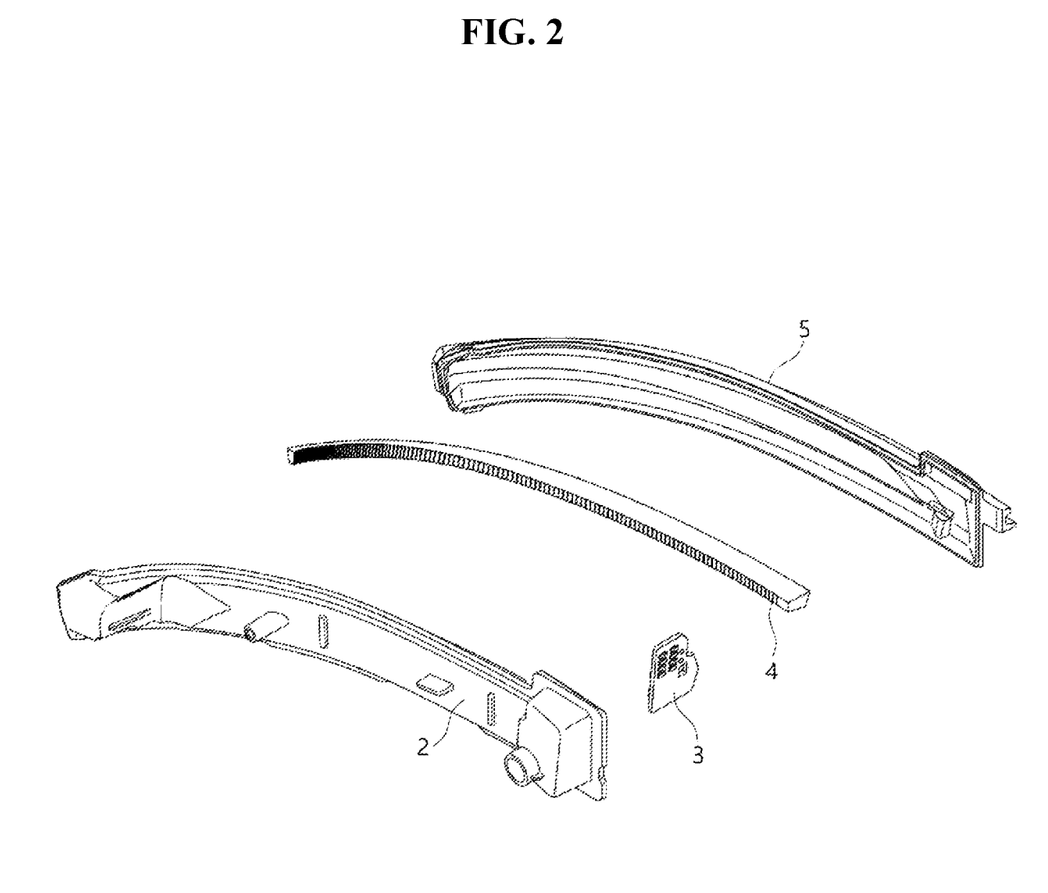
Figure 3:
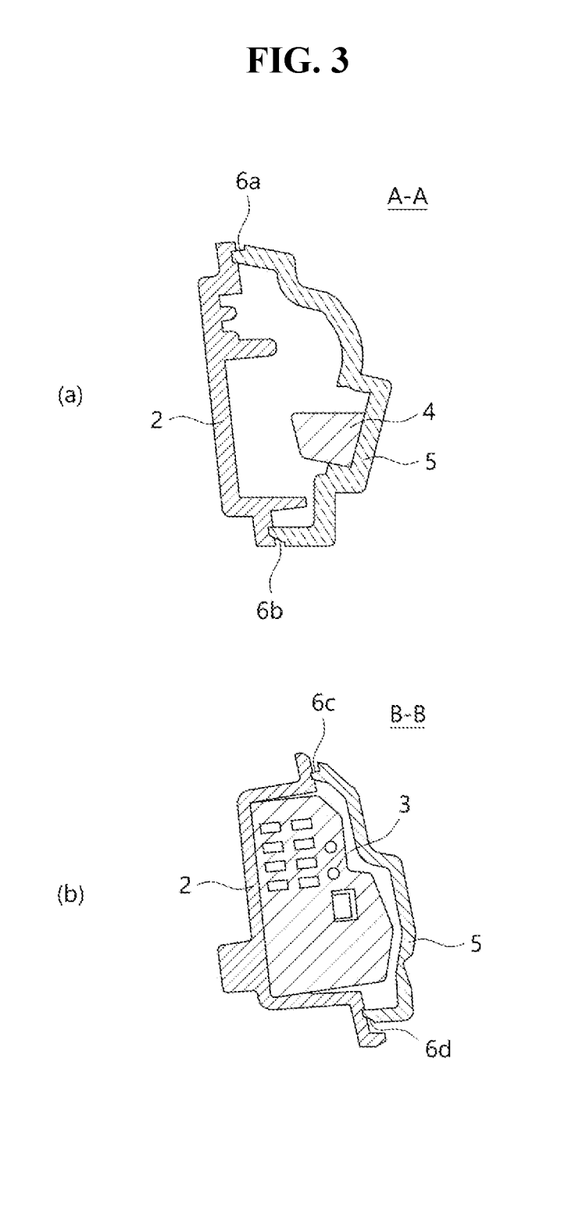

Vehicles are equipped with turn signal lamps to inform driving directions or alert conditions through light emission, and a case often occurs in which other drivers do not recognize the turn signal lamp because the turn signal lamps are installed on only the front and rear of a vehicle, resulting in traffic accidents. Accordingly, in recent years, efforts have been made to reduce traffic accidents by installing turn signal lamps on a side surface or side mirrors of a vehicle. FIGS. 1 to 3 are views for describing a conventional turn signal lamp for an outside mirror. Referring to FIG. 1, conventionally, a turn signal lamp 1 for enabling a driver to identify situations around a vehicle and indicating the driving direction of a vehicle through lighting is installed and used by being coupled to the side mirror installed on an outer surface of the vehicle.

Referring to FIG. 2, the conventional turn signal lamp 1 is composed of a housing 2, a printed circuit board (PCB) assembly 3, a light guide 4, and a lens 5, and in general, the light guide 4 and the PCB assembly 3 are coupled to the housing 2 and a rim of the lens 5 is assembled by being fused to the coupled housing 2 over the entire circumference. Referring to FIG. 3A, which is a cross-sectional view taken along line A-A in FIG. 1, and FIG. 3B, which is a cross-sectional view taken along line B-B in FIG. 1, it may be seen that the rim of the lens 5 is fused to the housing 2 over the entire circumference and thus fused portions 6a, 6b, 6c, and 6d are formed.

However, in the above-described conventional turn signal lamp 1, a size of the turn signal lamp 1 is limited to secure an assembly space of a light guide 4 and secure a fused surface for fusion of the entire circumference. In addition, as shown in FIG. 3A, there is a problem that, due to the existence of a wide fused section such as the housing 2 and the lens 5 being fused even in line A-A, vibration fusion is applied which takes a lot of time, and assembly quality according to a fusion distribution is poor. In addition, a problem of a lighting image defect occurs because moisture is created in a sealed internal space.

In order to solve these problems, it is necessary to develop a technology for a turn signal lamp for an outside mirror.

SUMMARY OF THE INVENTION

The present disclosure is directed to providing a turn signal lamp for an outside mirror, which does not apply a housing to a lens integrally applied with a light guide.

The present disclosure is also directed to providing a turn signal lamp for an outside mirror in which a light source unit is modularized and a lens insert injection is performed on the modularized light source unit.

The objects of this application are not limited to the above-described objects, and other objects not mentioned will be clearly understood by those skilled in the art to which the present disclosure pertains from this specification and the accompanying drawings.

According to an aspect of the present disclosure, there may be provided a turn signal lamp for an outside mirror installed at one side of the outside mirror for a vehicle, the turn signal lamp for an outside mirror including: a lens on which a light guide is integrally formed in a longitudinal direction and a light source module coupled to one side of the lens to output light, wherein the light source module includes a printed circuit board (PCB) substrate, a PCB assembly including at least one light emitting diode (LED) disposed on the PCB to output light, and a light source module case configured to accommodate the PCB assembly in an internal space, the light source module case includes a recess formed horizontally along a circumference of at least one surface of the light source module case, the lens includes a lens protrusion in which a part of the lens protrudes in a shape corresponding to the recess, and the lens protrusion is inserted into the recess to come into close contact with a front surface of the recess, so that the light source module and the lens are coupled to each other.

According to another aspect of the present disclosure, there may be provided an outside mirror including the turn signal lamp for an outside mirror and a mirror assembly in which the turn signal lamp for an outside mirror is mounted on one surface.

The configuration of the present disclosure is not limited to the above-described means, and means not mentioned will be clearly understood by those skilled in the art to which the present disclosure pertains from this specification and the accompanying drawings.

According to one embodiment of this application, by not applying a housing to a lens integrally applied with a light guide, it is possible to reduce the number of parts, and not limit the size of the turn signal lamp due to the light guide assembly space and the fused surface, thereby implementing various external appearances.

According to another embodiment of this application, it is possible to modularize and standardize the light source unit to reduce the number of development parts, use the stabilized standard parts, to improve quality, and perform a lens insert injection on the modularized light source unit, thereby shortening the processing time, preventing the assembly quality from being reduced by the fusion distribution, and reducing the defects of the lighting images due to moisture.

The effect of this application is not limited to the above-described effects, and other effects not mentioned will be clearly understood by those skilled in the art to which the present disclosure pertains from this specification and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The above-described objects, features, and advantages of the present disclosure will become more apparent from the following detailed description related to the accompanying drawings. However, since the present disclosure may have various changes and may have various embodiments, specific embodiments will be shown in the drawings and described in detail below.

In the drawings, the thicknesses of layers and regions are exaggerated for clarity, and in addition, when an element or a layer is "on" or "on" another element or layer, this includes all cases in which other elements or layers are interposed therebetween as well as directly on another element or layer. Throughout the specification, the same reference numerals refer to the same elements in principle. In addition, elements having the same function within the scope of the same spirit shown in the drawings of each embodiment will be described using the same reference numerals.

When it is determined that a detailed description of a known function or configuration related to the present disclosure may unnecessarily obscure the gist of the present disclosure, the detailed description thereof will be omitted. In addition, numbers (e.g., first and second) used in the description process of this specification are merely identification symbols for distinguishing one element from another.

In addition, the suffixes "module" and "part" for elements used in the following description are given or interchangeably used in consideration of only the ease of preparing the specification, and do not have distinct meanings or roles by themselves.

According to an aspect of the present disclosure, there may be provided a turn signal lamp for an outside mirror installed at one side of the outside mirror for a vehicle, and the turn signal lamp for an outside mirror includes: a lens on which a light guide configured to guide light is integrally formed in a longitudinal direction; and a light source module coupled to one side of the lens to output light, wherein the light source module includes a printed circuit board (PCB) substrate, a PCB assembly including at least one light emitting diode (LED) disposed on the PCB to output light, and a light source module case configured to accommodate the PCB assembly in an internal space, the light source module case includes a recess formed horizontally along a circumference of at least one surface of the light source module case, the lens includes a lens protrusion in which a part of the lens protrudes in a shape corresponding to the recess, and the lens protrusion is inserted into the recess to come into close contact with a front surface of the recess so that the light source module and the lens are coupled to each other.

In one embodiment, the light source module case includes a first protrusion protruding to an outside of the light source module case and a second protrusion protruding to the outside of the light source module case and located more in a direction of the lens than the first protrusion to face the first protrusion, and the recess may be formed between the first protrusion and the second protrusion.

In one embodiment, protruded lengths of the first protrusion and the second protrusion may be different from each other.

In one embodiment, the lens protrusion may have substantially the same plane as at least one of the first protrusion and the second protrusion in a vertical direction.

In one embodiment, the recess may be located on one surface of a side at which the light guide of the light source module case extends and at least one of both surfaces adjacent thereto, the turn signal lamp for an outside mirror may further include a third protrusion protruding to the outside of the light source module case on a surface of the light source module case in which the recess is not located, and a part of the lens protrusion may be located on the third protrusion so that the lens is supported by the third protrusion.

In one embodiment, the light source module case may include the first protrusion, a light source module housing with one open surface, the second protrusion, and a light source module cap coupled to the light source module housing.

In one embodiment, a hook disposed on the light source module cap and a hook fastening part disposed in the light source module housing may be hook-fastened, so that the light source module housing and the light source module cap may be coupled to each other.

In one embodiment, the lens protrusion is inserted into the recess when the lens is molded by insert injection, so that the light source module and the lens may be coupled and fixed.

In one embodiment, the light source module cap may be made of a transparent material, and the light source module housing may be made of an opaque material.

In one embodiment, the light source module cap may have a second optical refractive index corresponding to a first optical refractive index of the lens.

In one embodiment, the light source module cap includes a curved portion curved at a predetermined location with one inner surface of an inner surface formed vertically, and the PCB may be disposed parallel to the one inner surface so that the light output from the at least one LED is vertically incident on the one inner surface.

In one embodiment, the light source module may have substantially the minimum size to accommodate the PCB assembly.

According to another aspect of the present disclosure, there may be provided an outside mirror including the turn signal lamp for an outside mirror and a mirror assembly in which the turn signal lamp for an outside mirror is mounted on one surface.

Figure 4:
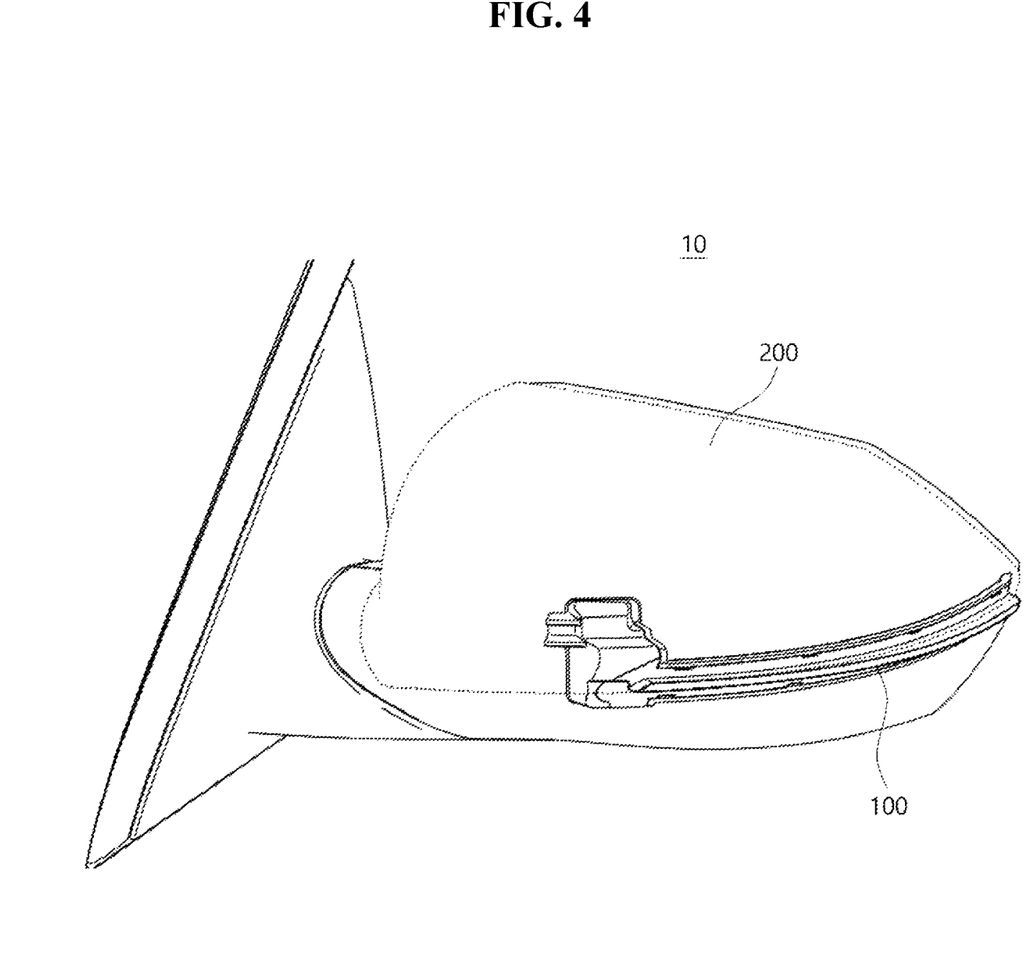
FIG. 4 is a view for describing an outside mirror for a vehicle according to one embodiment.

FIG. 4 is a view for describing an outside mirror for a vehicle according to one embodiment.

Referring to FIG. 4, an outside mirror 10 for a vehicle installed at both sides of a vehicle body and having a turn signal function may include a turn signal lamp 100 for an outside mirror and a mirror assembly 200.

The turn signal lamp 100 for an outside mirror may be implemented in various appearances. For example, the turn signal lamp 100 for an outside mirror may be implemented in an appearance that has an overall elongated band shape with a rectangular parallelepiped space for accommodating some components at one end. Of course, the turn signal lamp 100 for an outside mirror may be implemented in different appearances through various design changes and implemented differently by making a light distribution shape a circle, a heart, or the like.

The turn signal lamp 100 for an outside mirror may be disposed on one surface of the mirror assembly 200. For example, the turn signal lamp 100 for an outside mirror may be mounted in a space corresponding to the shape of the turn signal lamp 100 for an outside mirror formed on one surface of the mirror assembly 200.

The mirror assembly 200 is a housing of the outside mirror 10 for a vehicle, and may have additional components disposed therein. For example, a mirror may be mounted on one surface of the mirror assembly 200, and the turn signal lamp 100 for an outside mirror may be mounted on the other surface of the mirror assembly 200.

The turn signal lamp 100 for an outside mirror may be formed and mounted in various shapes at various locations of the mirror assembly 200 through various design changes.

Figure 5:
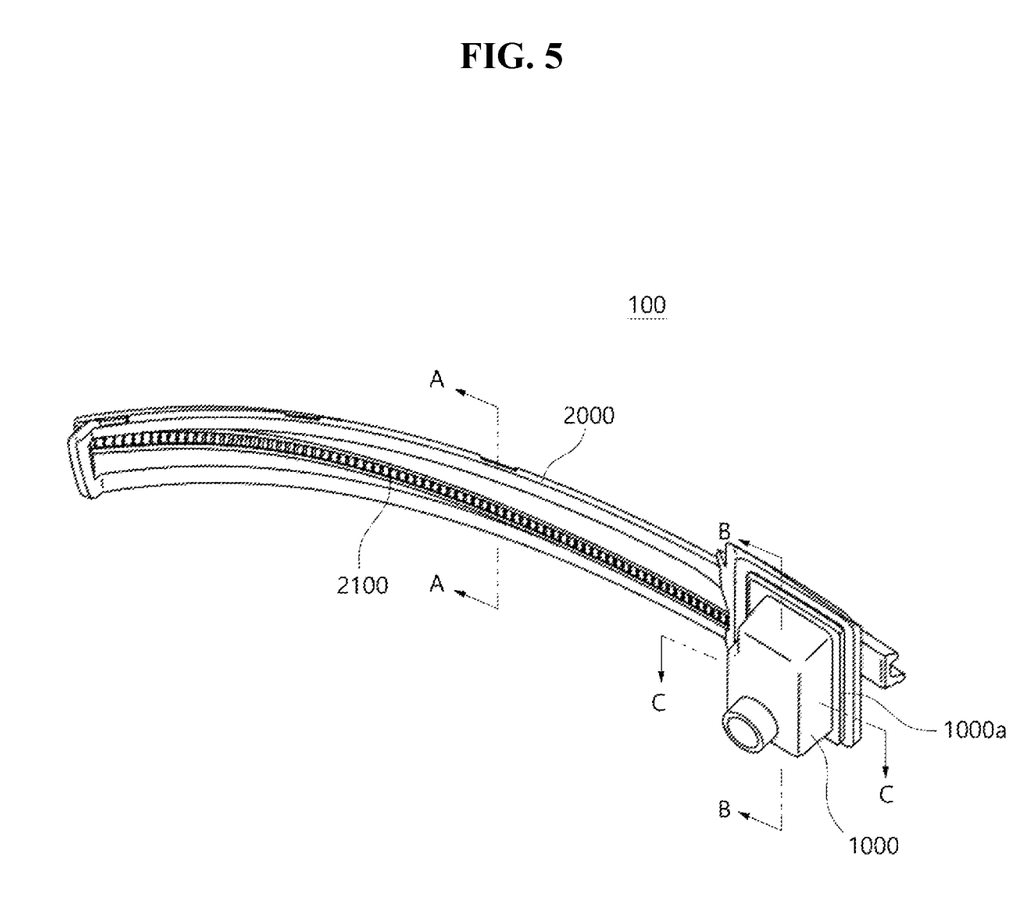
FIG. 5 is a perspective view of a turn signal lamp for an outside mirror according to one embodiment.

FIG. 5 is a perspective view of the turn signal lamp for an outside mirror according to one embodiment.

Referring to FIG. 5, the turn signal lamp 100 for an outside mirror according to one embodiment may include a light source module 1000 and a lens 2000. Here, the light source module 1000 may be located at one side of the turn signal lamp 100 for an outside mirror, but is not limited thereto, and may also be located at a center of the turn signal lamp 100 for an outside mirror.

The light source module 1000 may be a module that outputs light. For example, the light source module 1000 may have a light source located therein and may be located at one side of the lens 2000.

In addition, the light source module 1000 may be implemented as a separate module. In other words, the light source module 1000 may be manufactured separately from the lens 2000, and the light source module 1000 may be coupled with the lens 2000 later.

The lens 2000 may be installed at one side of the outside mirror 10 for a vehicle. For example, the lens 2000 may be installed at one side of the outside mirror 10 for a vehicle to block foreign substances from being introduced from the outside, and reduce the impact received from the outside.

The lens 2000 may guide the light emitted from the coupled light source module 1000. For example, the lens 2000 may include a visible surface located outside, an inner surface located inside to face the visible surface, and a light guide 2100 configured to guide the light emitted from the light source module 1000. Here, the lens 2000 and/or the light guide 2100 may be made of an optical material such as a transparent polymethyl methacrylate (PMMA) material for the light guide.

The light source module 1000 may be installed at any one side of the light guide 2100, and the light generated from the light source module 1000 may move along the light guide 2100 and then may be emitted to the outside of the light guide 2100.

Figure 6:
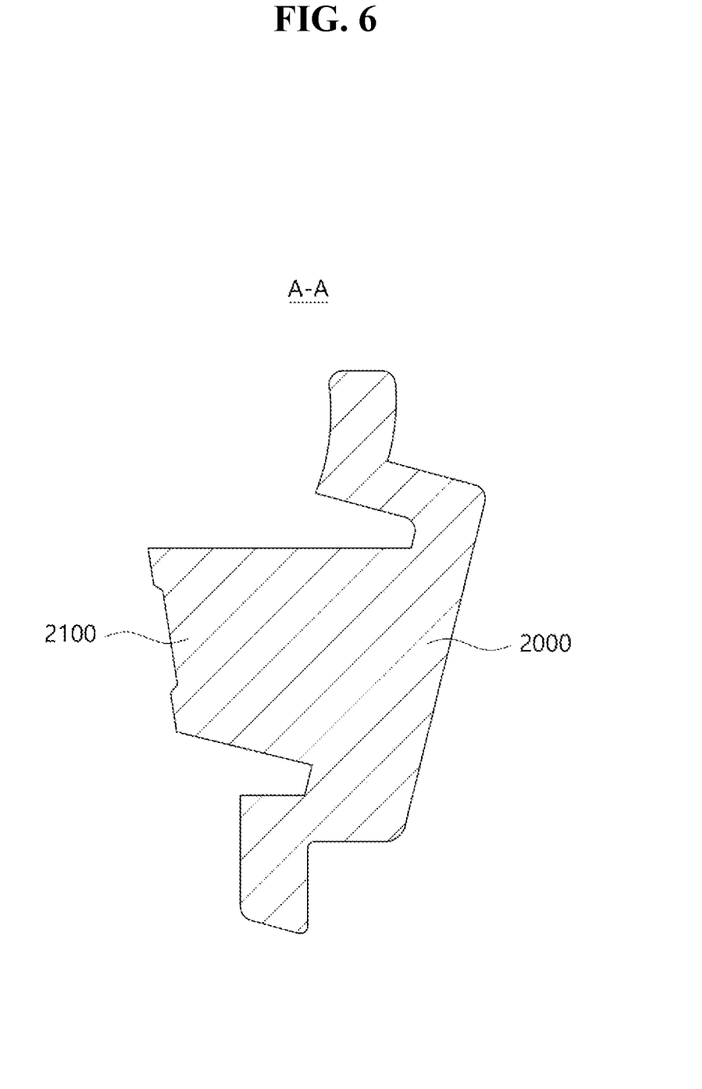
FIG. 6 is a cross-sectional view taken along line A-A in FIG. 5.

In one embodiment, the lens 2000 may be integrally formed or coupled with the light guide 2100. For example, the lens 2000 may include the light guide 2100 having the same or similar optics as or to the conventional light guide applied therein and extending in the longitudinal direction and integrally coupled thereto. The lens 2000 and the light guide 2100 have a structure integrally formed without using a separate assembly member, thereby reducing the number of parts and reducing cost. When the light guide 2100 is coupled to the lens 2000 by a separate assembly member, there is a concern that diffusion reflection by the assembly member may occur when the light source module 1000 is turned on, and thus the amount of light radiated to the outside is not sufficiently secured, thereby reducing light efficiency, but it is possible to prevent this problem. Referring to FIG. 6, which is a cross-sectional view taken along line A-A in FIG. 5, it may be seen that the lens 2000 and the light guide 2100 are integrally configured.

Figure 7:
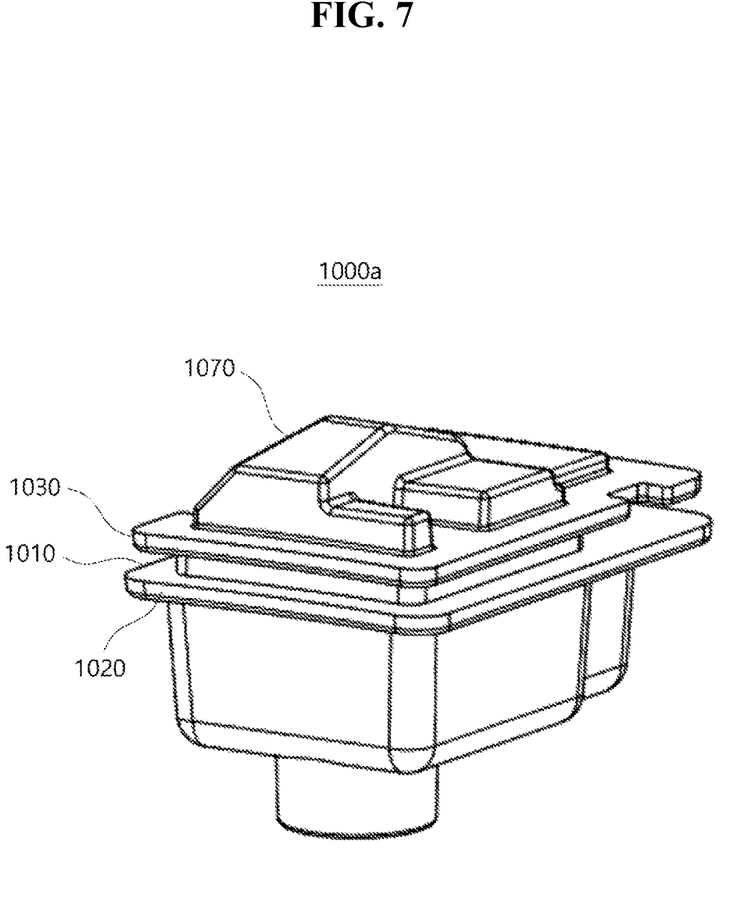
FIGS. 7 to 9 are views for describing a light source module according to one embodiment.
Figure 8:
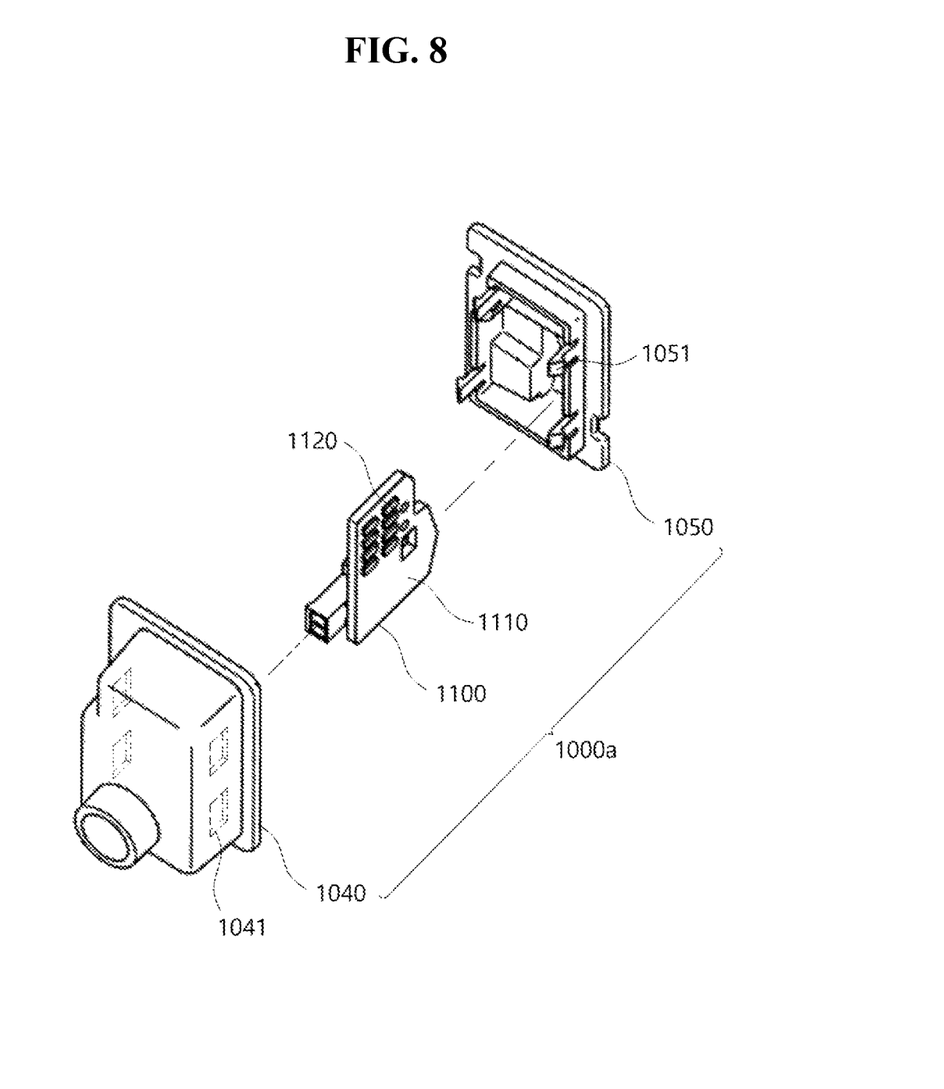
Figure 9:
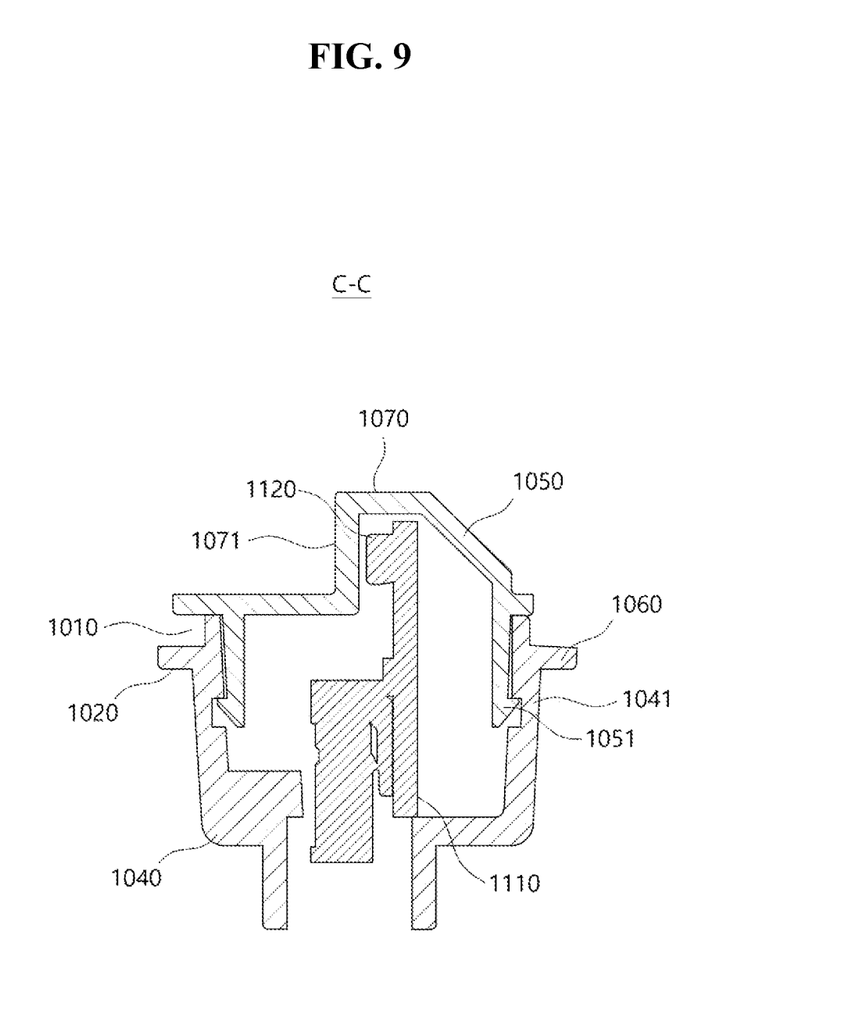

FIGS. 7 to 9 are views for describing the light source module according to one embodiment.

Referring to FIGS. 7 to 9, the light source module 1000 may include a light source module case 1000a and a PCB assembly 1100.

The PCB assembly 1100 may be configured to output light as a light source. For example, the PCB assembly 1100 may include a PCB substrate 1110 and at least one LED 1120. For example, the PCB assembly 1100 may have a structure in which the PCB substrate 1110 on which at least one LED 1120 is mounted is integrated. The PCB substrate 1110 and at least one LED 1120 connected to the PCB substrate 1110 via an electric wire (not shown) may receive power to emit light. Here, the PCB assembly 1100 may be disposed inside the light source module 1000 so that the light output from the light source of the PCB assembly 1100 is incident on the lens 2000.

The light source module case 1000a may be configured to accommodate a light source in an internal space. For example, the PCB assembly 1100 may be mounted in a groove formed in a part of the inside of the light source module case 1000a.

In addition, the light source module case 1000a may have various shapes. For example, the light source module case 1000a may have a curved rectangular parallelepiped shape as a whole, but is not limited thereto, and may also have a cylindrical three-dimensional structure. In addition, the light source module case 1000a may include a hole formed in a part thereof and configured to facilitate communication between the sealed internal space and the outside.

In addition, the light source module case 1000a may have a size corresponding to a size of the PCB assembly 1100. For example, the light source module case 1000a may have the substantially minimum size to accommodate the PCB assembly 1100. Specifically, the light source module case 1000a may be larger than the minimum size to accommodate the PCB assembly 1100 by a predetermined rate, and the predetermined rate may include 1%, 5%, 10%, 15%, 20%, etc., but is not limited thereto. Accordingly, the size of the light source module 1000 is reduced, thereby removing the limitation to the light guide assembly space and the size of the turn signal lamp.

In one embodiment, the light source module case 1000a may include a recess 1010. For example, the recess 1010 is a portion recessed in at least one surface of the light source module case 1000a and may be formed horizontally along a circumference of the light source module case 1000a.

A part of the lens 2000 is inserted into the recess 1010, so that the light source module 1000 and the lens 2000 may be coupled to each other. For example, the lens 2000 may be located on the light source module case 1000a, and a part protruding from the lens 2000 is located in the recess 1010 formed in the light source module case 1000a, so that the lens 2000 and the light source module 1000 may be coupled as a separation direction of the part protruding from the lens 2000 is limited due to the structural characteristics. Here, the part protruding from the lens 2000 may be a lens protrusion 2200 to be described below, and a detailed description thereof will be provided below.

In one embodiment, the recess 1010 may be formed by a first protrusion 1020 and a second protrusion 1030 formed in the light source module case 1000a. For example, the recess 1010 may be formed between the first protrusion 1020 and the second protrusion 1030 facing each other. Here, the second protrusion 1030 may be a portion located more in a direction of the lens 2000 (upward direction in FIG. 7 for convenience) than the first protrusion 1020.

The first protrusion 1020 and the second protrusion 1030 may be a portion formed on at least one surface of the light source module case 1000a to protrude in an outward direction. Here, the first protrusion 1020 and the second protrusion 1030 may be formed horizontally along the circumference of the light source module case 1000a.

Of course, the first protrusion 1020 and the second protrusion 1030 may have the same protruded length, but are not limited thereto and may have different lengths such as a protruded length of the first protrusion 1020 being different from a protruded length of the second protrusion 1030.

In one embodiment, the light source module case 1000a may include a third protrusion 1060 formed on a surface on which the recess 1010 is not located and protruding to the outside of the light source module case 1000a. A part of the lens 2000 may be supported by the third protrusion 1060.

In one embodiment, the light source module case 1000a may have a structure in which a light source module housing 1040 and a light source module cap 1050 are coupled. The light source module cap 1050 may be located more on the lens 2000 than the light source module housing 1040.

The light source module housing 1040 may have a structure for forming a space in which the PCB assembly 1100 is accommodated. For example, one surface of the light source module housing 1040 is opened to have an opening, and the PCB assembly 1100 may be installed in the light source module housing 1040.

The light source module cap 1050 may have a structure coupled to the light source module housing 1040 in order to form the space in which the PCB assembly 1100 is accommodated. For example, the light source module cap 1050 may have a shape corresponding to that of the light source module housing 1040. For example, the light source module cap 1050 may have a structure that covers an open portion of the light source module housing 1040 or is coupled to a part of the light source module housing 1040.

In one embodiment, the light source module housing 1040 and the light source module cap 1050 may be coupled to each other by hook-fastening.

For example, a hook 1051 disposed on the light source module cap 1050 and a hook fastening part 1041 disposed on the light source module housing 1040 are hook-fastened to each other and thus the light source module housing 1040 and the light source module cap 1050 may be coupled to each other.

Specifically, the hook fastening part 1041 may be a groove formed in an inner wall surface of the light source module housing 1040, and the hook fastening part 1041 may be disposed at a location corresponding to the hook 1051 when being fastened with the hook 1051. In addition, the hook 1051 may protrude from the light source module cap 1050 by a certain portion, and the hook 1051 may be disposed at a location corresponding to the hook fastening part 1041 when being fastened with the hook fastening part 1041 of the light source module housing 1040.

Accordingly, there is an advantage in that it is possible to significantly shorten the time of the assembly process of the light source module 1000 by hook assembly. Here, the light source module 1000 may be in an unsealed state only by fastening the hook fastening part 1041 and the hook 1051.

Of course, the light source module 1000 may also have an opposite structure, such as the hook fastening part 1041 being formed in the light source module housing 1040, and the hook 1051 being formed in the light source module cap 1050, and the light source module housing 1040 and the light source module cap 1050 may also be coupled in a different manner such as being fused therebetween.

In addition, the light source module cap 1050 may be made of an optical material in order to emit the light emitted from the light source inside the light source module 1000 to the outside. For example, the light source module cap 1050 may be made of an optical material such as a transparent PMMA material.

The light source module cap 1050 may have a second refractive index corresponding to a first optical refractive index of the lens 2000. For example, for the light source module cap 1050, when the light generated inside the light source module 1000 is transmitted through the light source module cap 1050 and the lens 2000, the second optical refractive index of the light source module cap 1050 and the first optical refractive index of the lens 2000 may be designed so that the maximum light output is maintained. For another example, the light source module cap 1050 may be made of a material having the same refractive index as that of the lens 2000.

The light source module cap 1050 is a portion curved at a predetermined location and may include a curved portion 1070 protruding in an outward direction of the light source module cap 1050. For example, the curved portion 1070 may have one inner surface 1071 formed vertically, and the one inner surface 1071 may be formed parallel to the PCB substrate 1110 so that the light output from the at least one LED 1120 is vertically incident on the one inner surface. Accordingly, it is possible to increase efficiency of the light emitted to the outside from the lens 2000.

In addition, the light source module housing 1040 may be made of a non-optical material not to emit the light emitted from the light source inside the light source module 1000 to the outside. For example, the light source module housing 1040 may be made of an opaque material or the like. This is to prevent light from being emitted from a lower portion of the light source module case 1000a to the outside.

Figure 10:
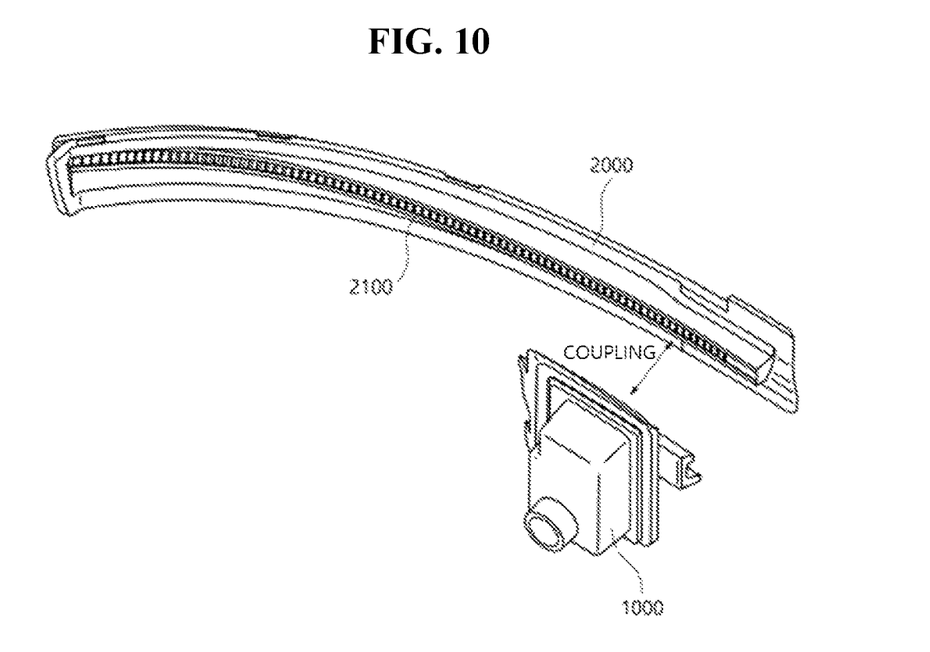
FIGS. 10 to 12 are views for describing the coupling between the light source module and a lens.
Figure 11:
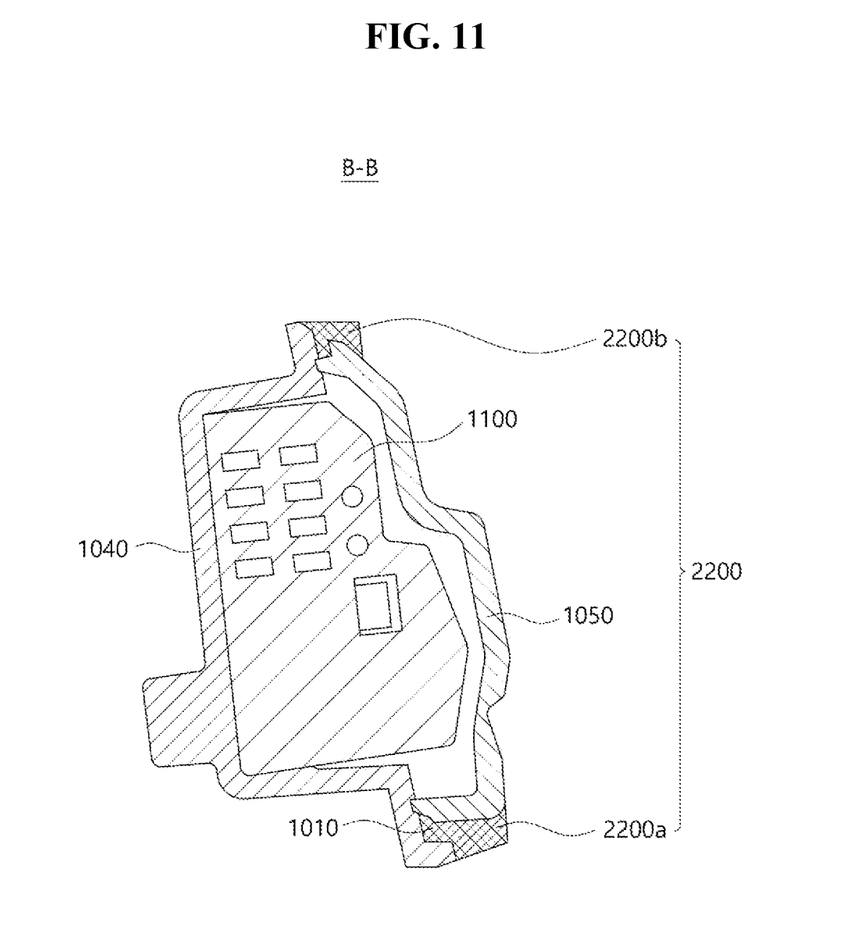
Figure 12:
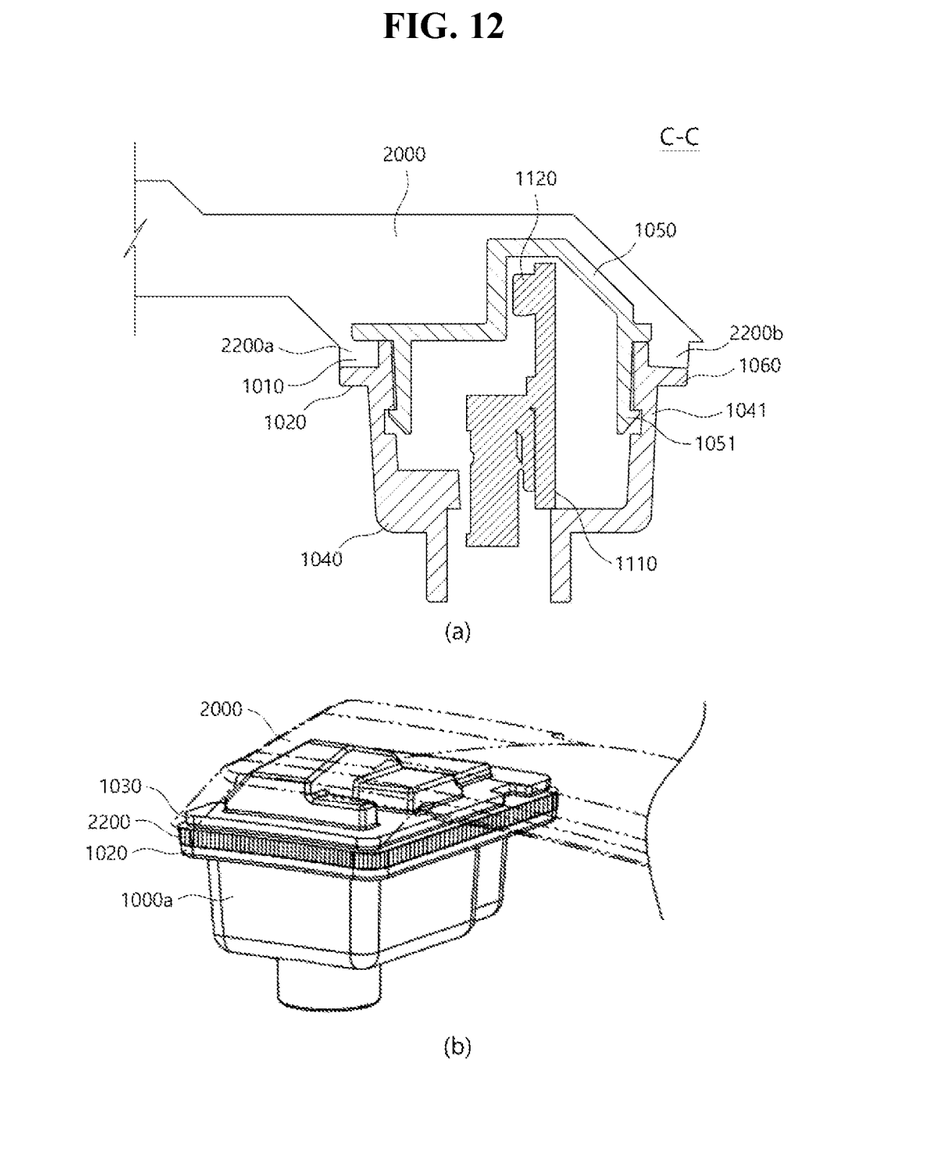

FIGS. 10 to 12 are views for describing the coupling between the light source module and the lens.

Referring to FIG. 10, in the light source module 1000 according to one embodiment, the lens protrusion 2200 may be inserted into the recess 1010 and coupled to the lens 2000.

For example, the lens protrusion 2200, which is a portion in which a part of the lens 2000 protrudes in a shape corresponding to the recess 1010 may be inserted into the recess 1010 formed horizontally along the circumference of the light source module case 1000a on at least one surface of the light source module case 1000a. Here, the lens protrusion 2200 may come into close contact with a front surface of the recess 1010 so that the recess 1010 is closed, so that the lens 2000 and the light source module 1000 may be coupled to each other.

In one embodiment, when the lens 2000 is injected, the lens 2000 may be inserted into a mold to be insert-injected and thus sealed, and at the same time, the light source module 1000 and the lens 2000 may be coupled to each other. In other words, the lens protrusion 2200 may be inserted and integrated into the recess 1010 when the lens 2000 is molded by the insert injection, and the light source module 1000 and the lens 2000 may be coupled and fixed.

Accordingly, the turn signal lamp 100 for an outside mirror according to one embodiment does not need a subsequent assembling process after injection, and the fusion distribution of the lens 2000 does not occur, thereby improving the assembly quality. In addition, the turn signal lamp 100 for an outside mirror according to one embodiment can use the standardized light source module 1000 to reduce the number of development parts, and use the stabilized parts to improve the quality.

A part 2200a of the lens protrusion 2200 may be located in the recess 1010 to couple the lens 2000 and the light source module 1000. Here, the recess 1010 may be formed by the first protrusion 1020 and the second protrusion 1030.

In one embodiment, the protruded lengths of the first protrusion 1020 and the second protrusion 1030 may be different from each other. For example, the protruded length of the first protrusion 1020 may be greater than the protruded length of the second protrusion 1030. Accordingly, the part 2200a of the lens protrusion 2200 located in the recess 1010 can be more stably supported by the first protrusion 1020, so that the lens 2000 and the light source module 1000 may be coupled more firmly.

In addition, the lens protrusion 2200 may form substantially the same plane as at least one of the first protrusion 1020 and the second protrusion 1030 in a vertical direction. For example, the part 2200a of the lens protrusion 2200 may form substantially the same plane as a longer protrusion among the first protrusion 1020 and the second protrusion 1030 in a vertical direction. Specifically, the part 2200a of the lens protrusion 2200 may form substantially the same plane as the first protrusion 1020 having a longer length than the second protrusion 1030 in a vertical direction. Through the lens 2000 having such a structure, the light incident on the lens 2000 from the light source module 1000 may be well guided to the outside along the light guide 2100.

The other part 2200b of the lens protrusion 2200 may be formed on a surface on which the recess 1010 is not located and located on the third protrusion 1060 protruding to the outside of the light source module case 1000a.

For example, the recess 1010 is located on one surface of a side at which the light guide 2100 of the light source module case 1000a extends and at least one of both surfaces adjacent thereto, and the third protrusion 1060 may be located on a surface of the light source module case 1000a in which the recess 1010 is not located. Here, a part of the lens 2000 may be located on the third protrusion 1060 so that the lens 2000 is supported by the third protrusion 1060. Accordingly, the lens 2000 and the light source module 1000 can be coupled more firmly.

The turn signal lamp 100 for an outside mirror according to one embodiment does not require a subsequent assembly process because the light source module 1000 is inserted into the mold when the lens 2000 integrally formed with the light guide 2100 is injected, and the fusion distribution of the lens 2000 does not occur, thereby improving the assembly quality. In addition, it is possible to use the standardized light source module 1000 to reduce the number of development parts, and use the stabilized parts to improve the quality.

Of course, the turn signal lamp 100 for an outside mirror according to one embodiment is not limited to the above description, and may be differently implemented such as some components being omitted or substituted or some components being added, such as additionally providing a reflector (not shown) to a part of the turn signal lamp 100 for an outside mirror.

The configurations and features of the present disclosure have been described above based on the exemplary embodiments, but the present disclosure is not limited thereto, and it will be apparent to those skilled in the art to which the present disclosure pertains that the present disclosure may be variously changed or modified without departing from the spirit and scope of the present disclosure, so that it should be noted that these changes or modifications belong to the appended claims.

What is claimed is:

1. A turn signal lamp for an outside mirror installed at one side of the outside mirror for a vehicle, the turn signal lamp comprising:
a lens on which a light guide for guiding light is integrally formed in a longitudinal direction; and
a light source module coupled to one side of the lens to output light, wherein the light source module includes:
a printed circuit board (PCB);
a PCB assembly including at least one light emitting diode (LED) disposed on the PCB to output light; and
a light source module case configured to accommodate the PCB assembly in an internal space,
wherein the light source module case includes a recess formed horizontally along a circumference of at least one surface of the light source module case,
the lens includes a lens protrusion in which a part of the lens protrudes in a shape corresponding to the recess,
the lens protrusion is inserted into the recess to come into close contact with a front surface of the recess, so that the light source module and the lens are coupled to each other;
wherein the light source module case includes:
a first protrusion protruding to an outside of the light source module case;
a second protrusion protruding to the outside of the light source module case, and located more in a direction of the lens than the first protrusion to face the first protrusion;
a light source module housing with one opened surface; and
a light source module cap coupled to the light source module housing,
where the recess is formed between the first protrusion and the second protrusion.

2. The turn signal lamp of claim 1, wherein the first protrusion and the second protrusion have different protruded lengths.

3. The turn signal lamp of claim 2, wherein the lens protrusion has substantially the same plane as at least one of the first protrusion and the second protrusion in a vertical direction.

4. The turn signal lamp of claim 1, wherein the recess is located on one surface of a side in which the light guide of the light source module case extends and 5 at least one of both surfaces adjacent thereto, the turn signal lamp further includes a third protrusion protruding to the outside of the light source module case on a surface of the light source module case in which the recess is not located, and a part of the lens protrusion is located on the third protrusion so that the lens is supported by the third protrusion.

5. The turn signal lamp of claim 1, wherein a hook disposed on the light source module cap and a hook fastening part disposed in the light source module housing are fastened and thus the light source module housing and the light source module cap are coupled to each other.

6. The turn signal lamp of claim 5, wherein the lens protrusion is inserted into the recess when the lens is molded by insert injection, and thus the light source module and the lens are coupled and fixed.

7. The turn signal lamp of claim 1, wherein the light source module cap is made of a transparent material, and the light source module housing is made of an opaque material.

8. The turn signal lamp of claim 7, wherein the light source module cap has a second optical refractive index corresponding to a first optical refractive index of the lens.

9. The turn signal lamp of claim 7, wherein the light source module cap includes a curved portion curved at a predetermined location and in which one inner surface of an inner surface thereof is formed vertically, and the PCB is disposed in parallel with the one inner surface so that the light emitted from the at least one LED is vertically incident on the one inner surface.

10. The turn signal lamp of claim 1, wherein the light source module has a substantially minimum size to accommodate the PCB assembly.

11. An outside mirror comprising:
a turn signal lamp for an outside mirror; and a mirror assembly in which the turn signal lamp for the outside mirror is mounted on one surface,
wherein the turn signal lamp comprises:
a lens on which a light guide for guiding light is integrally formed in a longitudinal direction; and
a light source module coupled to one side of the lens to output light,
wherein the light source module includes:
a printed circuit board (PCB);
a PCB assembly including at least one light emitting diode (LED) disposed on the PCB to output light; and
a light source module case configured to accommodate the PCB assembly in an internal space, wherein the light source module case includes a recess formed horizontally along a circumference of at least one surface of the light source module case,
the lens includes a lens protrusion in which a part of the lens protrudes in a shape corresponding to the recess, and
the lens protrusion is inserted into the recess to come into close contact with a front surface of the recess, so that the light source module and the lens are coupled to each other;
wherein the light source module case includes:
a first protrusion protruding to an outside of the light source module case;
a second protrusion protruding to the outside of the light source module case, and located more in a direction of the lens than the first protrusion to face the first protrusion;
a light source module housing with one opened surface; and
a light source module cap coupled to the light source module housing,
where the recess is formed between the first protrusion and the second protrusion.

* * * * *